US012756072B2

(12) United States Patent
Park

(10) Patent No.: US 12,756,072 B2
(45) Date of Patent: Oct. 6, 2026

(54) BATTERY PACK

(71) Applicant: Samsung SDI Co., Ltd., Yongin-si (KR)

(72) Inventor: Sang Hun Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 754 days.

(21) Appl. No.: 18/175,979

(22) Filed: Feb. 28, 2023

(65) Prior Publication Data

US 2023/0282946 A1 Sep. 7, 2023

(30) Foreign Application Priority Data

Mar. 4, 2022 (KR) ........................ 10-2022-0027935

(51) Int. Cl.
*H01M 50/503* (2021.01)
*H01M 50/574* (2021.01)

(52) U.S. Cl.
CPC ....... *H01M 50/503* (2021.01); *H01M 50/574* (2021.01)

(58) Field of Classification Search
CPC ............. H01M 50/284; H01M 50/503; H01M 50/574; H01M 10/425; H01M 50/55; H01M 50/211; H01M 50/533; H01M 50/553; Y02E 60/10
See application file for complete search history.

(56) References Cited

U.S. PATENT DOCUMENTS

| | | | | |
|---|---|---|---|---|
| 2011/0281140 A1* | 11/2011 | Lee | ..................... | H01M 50/528 429/7 |
| 2014/0338726 A1* | 11/2014 | Nobori | .................... | H10F 19/80 136/246 |
| 2018/0183112 A1* | 6/2018 | Cheong | ............... | H01M 50/284 |

FOREIGN PATENT DOCUMENTS

| | | |
|---|---|---|
| JP | 2015-099723 A | 5/2015 |
| KR | 10-1156266 B1 | 6/2012 |
| KR | 10-1289280 B1 | 8/2013 |
| KR | 10-2020-0029628 A | 3/2020 |

(Continued)

OTHER PUBLICATIONS

Notice of opinion submission dated Jul. 31, 2024 in corresponding Korean patent application No. 10-2-22-0027935, 12 pp.

*Primary Examiner* — Jennifer Dieterle
(74) *Attorney, Agent, or Firm* — Knobbe, Martens, Olson & Bear, LLP

(57) ABSTRACT

A battery pack is proposed. The battery pack may include an electrode assembly, a circuit board having a positive electrode tab connector portion, and a negative electrode tab connector portion, and an anisotropic conductive film interposed between the negative electrode tab and the negative electrode tab connector portion. The negative electrode tab connector portion may include a reference line extending along the length of the circuit board and a plurality of auxiliary lines extending from the reference line along the width direction of the circuit board and spaced apart from each other. Each of the plurality of auxiliary lines may include an auxiliary line-center line extending along the width direction and one or more protrusion patterns protruding from the auxiliary line-center line along the length direction. The battery pack can improve bonding strength between a tab connection portion and an electrode tab and can be easily electrically connected.

17 Claims, 7 Drawing Sheets

(56) References Cited

FOREIGN PATENT DOCUMENTS

| | | | | | |
|---|---|---|---|---|---|
| KR | 10-2089738 | B1 | | 3/2020 | |
| KR | 20200029628 | A | * | 3/2020 | ........... B32B 37/185 |

* cited by examiner

BATTERY PACK

CROSS-REFERENCE TO RELATED APPLICATION

This application claims priority to and the benefit of Korean Patent Application No. 10-2022-0027935 filed on Mar. 4, 2022 in the Korean Intellectual Property Office, the contents of which in its entirety are herein incorporated by reference.

BACKGROUND

1. Field

Various embodiments of the present disclosure relate to a battery pack.

2. Description of the Related Technology in general, an electronic device (e.g., a notebook computer, a mini notebook computer, a net book, a mobile computer, an ultra-mobile personal computer (UMPC), or a portable multimedia player (PMP)), employs a battery pack having multiple battery cells connected to each other in series and/or in parallel to form a portable power source. The battery pack includes a protective circuit module (PCM) for protecting the battery cells from over-charge, over-discharge, and/or over-current, and the battery cells and the PCM are incorporated into a case together.

The above information disclosed in this Background section is only for enhancement of understanding of the background of the described technology and therefore it may contain information that does not constitute prior art.

SUMMARY

The present disclosure provides a battery pack that improves bonding strength between a tab connection portion and an electrode tab and is easily electrically connected.

A battery pack according to an embodiment of the present disclosure may include an electrode assembly having a positive electrode tab and a negative electrode tab, a circuit board having a positive electrode tab connector portion electrically connected to the positive electrode tab, and a negative electrode tab connector portion electrically connected to the negative electrode tab, and an anisotropic conductive film interposed between the negative electrode tab and the negative electrode tab connector portion and electrically connecting the negative electrode tab and the negative electrode tab connector portion, wherein the negative electrode tab connector portion comprises a reference line extending along the length of the circuit board and a plurality of auxiliary lines extending from the reference line along the width direction of the circuit board and spaced apart from each other, and wherein each of the plurality of auxiliary lines comprises an auxiliary line-center line extending along the width direction and one or more protrusion patterns protruding from the auxiliary line-center line along the length direction.

The protrusion patterns may have a circular, polygonal or line shape.

When the protrusion patterns have a polygonal or line shape, at least one side of the protrusion patterns may have a substantially constant angle with respect to the auxiliary line-center line.

The substantially constant angle may be in the range of about 45 degrees to about 135 degrees.

The reference line and the auxiliary line-center line may be substantially perpendicular to each other.

The protrusion patterns may protrude to one side of the auxiliary line-center line.

The protrusion patterns may protrude substantially symmetrically with respect to each other on both sides of the auxiliary line-center line.

One side of the protrusion patterns of the plurality of auxiliary lines may be opposite to the protrusion patterns of adjacent auxiliary lines.

The reference line may include a first reference line connecting one side of the plurality of auxiliary lines, and a second reference line connecting the other side of the plurality of auxiliary lines.

The plurality of auxiliary lines may include first auxiliary lines connected only to the first reference line and second auxiliary lines connected only to the second reference line.

The widths of the first auxiliary lines may be different from the widths of the second auxiliary lines.

The lengths of the plurality of auxiliary lines extending in the width direction may be equal to or greater than the lengths of adjacent auxiliary lines.

The widths of the plurality of auxiliary lines extending in the length direction may be equal to or greater than the widths of adjacent auxiliary lines.

In each of the plurality of auxiliary lines, the auxiliary line-center line may have a bent portion.

The auxiliary lines may be spaced apart from each other to form a plurality of slits, and the plurality of slits may be sized to allow the anisotropic conductive film to move within the slits.

DETAILED DESCRIPTION

Figure 1:
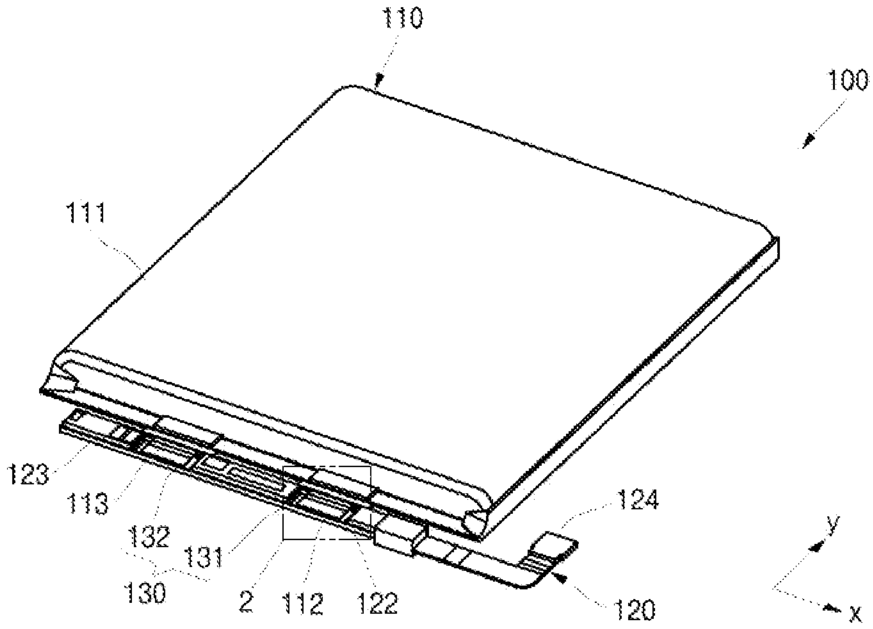
FIG. 1 is a perspective view illustrating a battery pack according to the present disclosure.

Hereinafter, a embodiments of the present disclosure will be described in detail with reference to the accompanying drawings.

Examples of the present disclosure are provided to more completely explain the present disclosure to those skilled in the art, and the following examples may be modified in various other forms. The present disclosure, however, may be embodied in many different forms and should not be construed as being limited to the example (or exemplary) embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components may be exaggerated for brevity and clarity. Like numbers refer to like elements throughout. As used herein, the term “and/or” includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Referring to FIG. 1, a perspective view illustrating a battery pack according to the present disclosure is shown. In addition, referring to FIG. 2, an enlarged perspective view of a rectangularly-marked portion 2 of FIG. 1 is shown. In addition, referring to FIG. 3, an exploded perspective view illustrating a tab assembly before being coupled in FIG. 1 is shown. Hereinafter, the battery pack 100 of the present disclosure will be described with reference to FIGS. 1 to 3.

Figure 2:
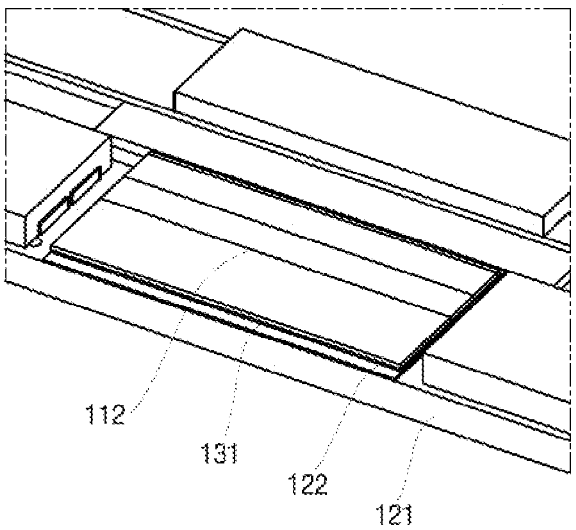
FIG. 2 is an enlarged perspective view of portion 2 of FIG. 1.
Figure 3:
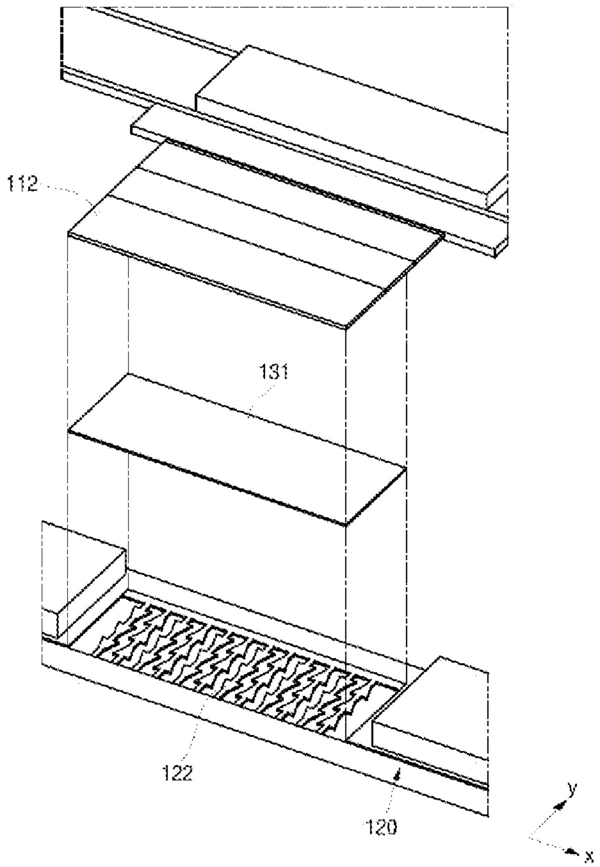
FIG. 3 is an exploded perspective view illustrating a tab assembly before being coupled in FIG. 1.

As shown in FIGS. 1 and 2, the battery pack 100 of the present disclosure includes a battery cell 110 and a protective circuit module 120 electrically connected to the battery cell 110. Of course, the battery pack 100 may further include a frame (not shown) surrounding the battery cell 110 and the protective circuit module 120. Here, a connector 124 of the protective circuit module 120 may be exposed to the outside of the frame and protrude.

First, in the battery cell 110, an electrode assembly (not shown) and an electrolyte (not shown) may be accommodated inside a case 111. Here, the electrode assembly may be manufactured by stacking a positive electrode plate, a negative electrode plate, and a separator interposed therebetween, or by winding the same, for example, in a jelly roll form. After being accommodated in the case 111 together with the electrolyte, the electrode assembly may be sealed. The assembled battery cell 110 may be a pouch-type secondary battery in which an electrode assembly is accommodated in a pouch-type case 111. The battery cell 110 may include a negative electrode tab 112 protruding from the front surface of the battery cell 110 and electrically connected to the negative electrode plate. The battery cell 100 may also include a positive electrode tab 113 spaced apart from the negative electrode tab 112 by a predetermined distance, protruding outward from the front surface of the battery cell 110, and electrically connected to the positive electrode plate. That is, the battery cell 110 may include the electrode tabs 112 and 113 protruding from the front surface of the battery cell 110.

The protective circuit module 120 includes a plate-shaped circuit board 121 on which a plurality of wiring patterns are formed. The circuit board 121 may have a plate shape and may extend along the length direction (x) of the front surface of the battery cell 110. In addition, the circuit board 121 may further include a plurality of protection elements (not shown) electrically connected through the wiring patterns. In addition, the protective circuit module 120 may further include tab connector portions 122 and 123 respectively connected to the negative tab 112 and the positive tab 113 of the battery cell 110. The tab connector portions 122 and 123 may include metal plates including a plurality of patterns, and may be adhered to and/or fixed to the circuit board 121. The tab connector portions 122 and 123 may be electrically connected to a plurality of protection elements through the wiring patterns provided on the circuit board 121. The plurality of pattern shapes of the tab connector portions 122 and 123 will be described in detail below.

In addition, the circuit board 121 may be electrically connected to the externally exposed and protruding connector 124. The protective circuit module 120 may be electrically connected to the outside through the connector 124 and may control charging and discharging of the battery cell 110.

The tab connector portions 122 and 123 to be electrically connected to the battery cell 110 may be provided on the upper surface of the circuit board 121. The tab connector portions 122 and 123 may be adhered and/or fixed to the circuit board 121. The tab connector portions 122 and 123 may include a negative electrode tab connector portion 122 and a positive electrode tab connector portion 123.

The tab connector portions 122 and 123 may be respectively electrically connected to the negative electrode tab 112 and the positive electrode tab 113 of the battery cell 110 by an anisotropic conductive film (ACF) 130. For example, the negative electrode tab connector portion 122 may be electrically connected to the negative electrode tab 112 of the battery cell 110 through a first anisotropic conductive film 130, and the positive electrode tab connector portion 123 may be electrically connected to the positive electrode tab 113 of the battery cell 110 through a second anisotropic conductive film.

The anisotropic conductive film 130 may include resin and a plurality of conductive balls 131 distributed in the resin. Here, the conductive balls may be shaped such that a metal material such as gold (Au), nickel (Ni), or palladium (Pd) is coated with a polymer. When pressure and heat are applied between first and second surfaces of the anisotropic conductive film 130, the conductive balls 131 included in the resin may collide with or otherwise contact each other due to the pressure, and the polymer coating may be peeled off. In addition, the anisotropic conductive film 130 becomes conductive by melting the metal material inside the conductive balls 131 from which the polymer coating is peeled off and connecting the first surface and the second surface to each other. That is, a portion of the anisotropic conductive film 130 to which heat and pressure are applied may become conductive.

The anisotropic conductive film 130 is interposed between the electrode tabs 112 and 113 and the tab connector portions 122 and 123, and becomes conductive when heat and pressure are applied between the electrode tabs 112 and 113 and the tab connector portions 122 and 123. Thus, the electrode tabs 112 and 113 and the tab connector portions 122 and 123 may be electrically connected.

Hereinafter, examples of pattern shapes of the tab connector portions 122 and 123 will be described with reference to FIGS. 4A to 4J. For convenience of description, the pattern shapes of the tab connector portions 122 and 123 will mainly be described with respect to the pattern of the negative electrode tab connector portion 122. Of course, the pattern shape of the positive electrode tab connector portion 123 may also be the same as or similar to that of the negative electrode tab connector portion 122. Here, the tab connector portions 122 and 123 may have patterns formed by partially removing a flat metal plate by laser processing or etching, or the tab connector portions 122 and 123 having patterns may be formed by plating, but the present disclosure does not limit the formation method thereof.

The negative electrode tab connector portion 122 may include a line-shaped reference line 122*a* extending along the length direction (x) of the circuit board 121 and a plurality of auxiliary lines 122*b* extending from the reference line 122*a* along the width direction (y) of the circuit board 121. Hereinafter, the length direction (x) of the circuit board 121 will be referred to as the length direction (x), and the width direction (y) of the circuit board 121 will be referred to as the width direction (y). Here, the width direction (y) may be substantially perpendicular to the length direction (x).

Here, the plurality of auxiliary lines 122*b* may be spaced apart from each other. That is, in the negative electrode tab connector portion 122, the plurality of auxiliary lines 122*b* may be spaced apart from each other, and slits may be formed between the spaced-apart auxiliary lines 122*b*. Due to the inclusion of the slits located between the auxiliary lines 122*b*, when the negative electrode tab 112 is compressed with the first anisotropic conductive film 131 interposed therebetween, the binder of the first anisotropic conductive film 131 may move easily within the slits.

Figure 4A:
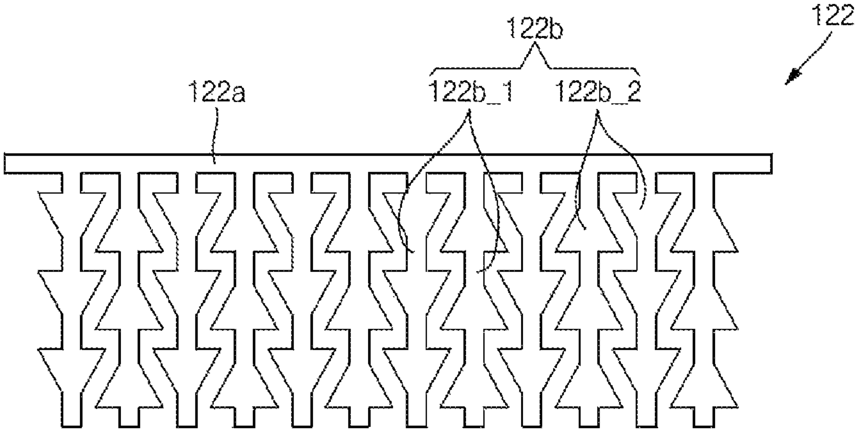
FIGS. 4A to 4J are plan views illustrating various examples of a tab connection part of the battery pack of FIG. 1.
Figure 4B:
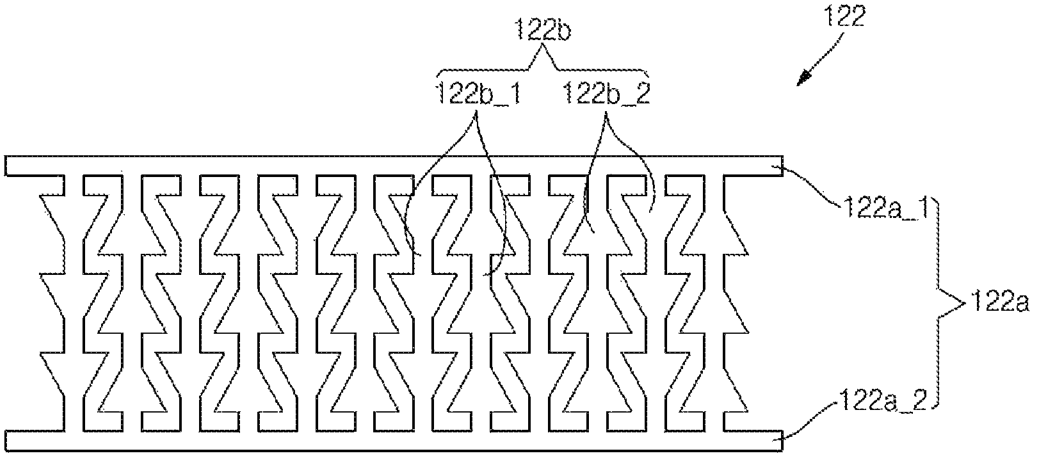

The reference line 122*a* may include one reference line 122*a* for connecting ends of the plurality of auxiliary lines 122*b* on one side of the plurality of auxiliary lines 122*b*, or two reference lines 122*a* for connecting ends of the plurality of auxiliary lines 122*b* on opposing sides of the plurality of auxiliary lines 122*b*, respectively. For example, the reference line 122*a* may include two reference lines 122*a*_1 and 122*a*_2. In an example, as shown in FIG. 4A, the plurality of auxiliary lines 122*b* may be connected to one reference line 122*a*. In another example, as shown in FIG. 4B, the plurality of auxiliary lines 122*b* may be connected between the first reference line 122*a*_1 and the second reference line 122*a*_2. The first reference line 122*a*_1 and the second reference line 122*a*_2 may be arranged parallel to each other.

Figure 4C:
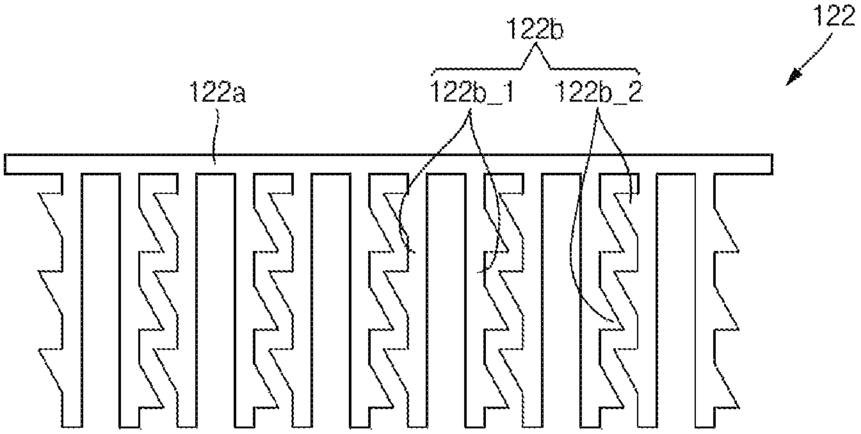
Figure 4D:
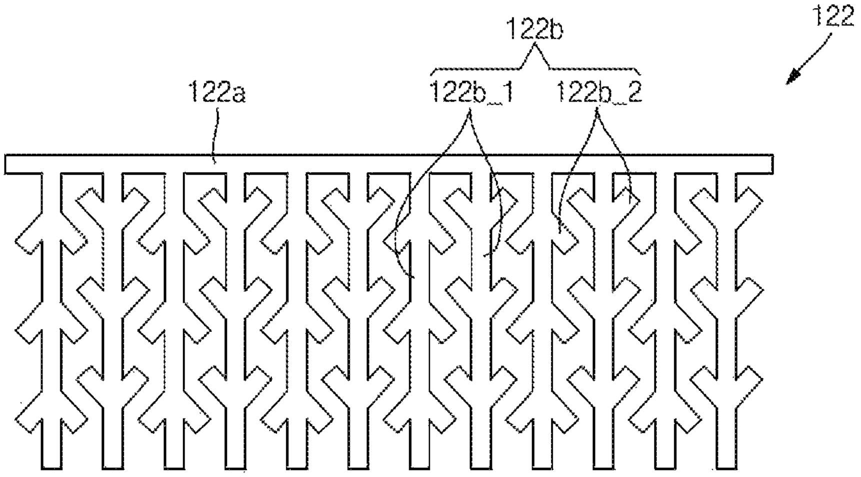
Figure 4E:
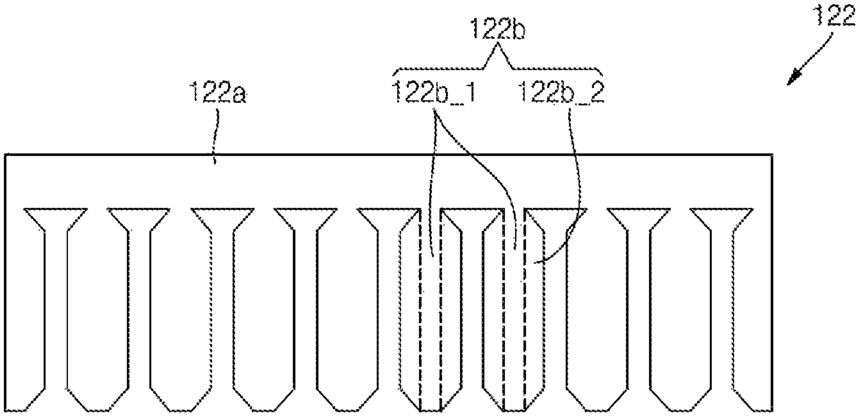
Figure 4F:
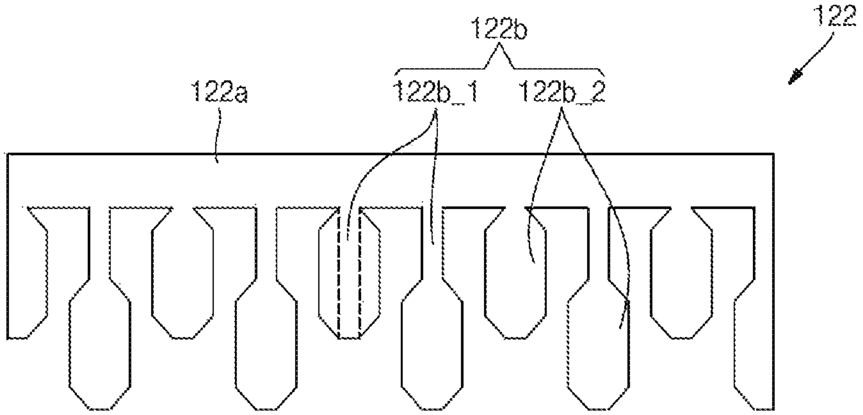
Figure 4G:
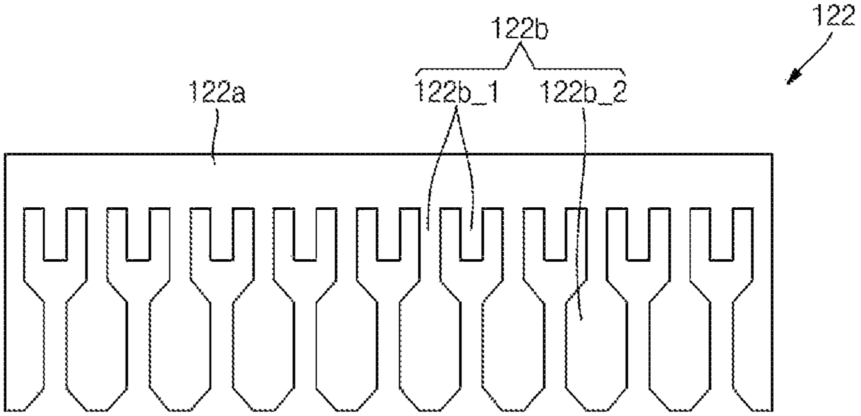
Figure 4H:
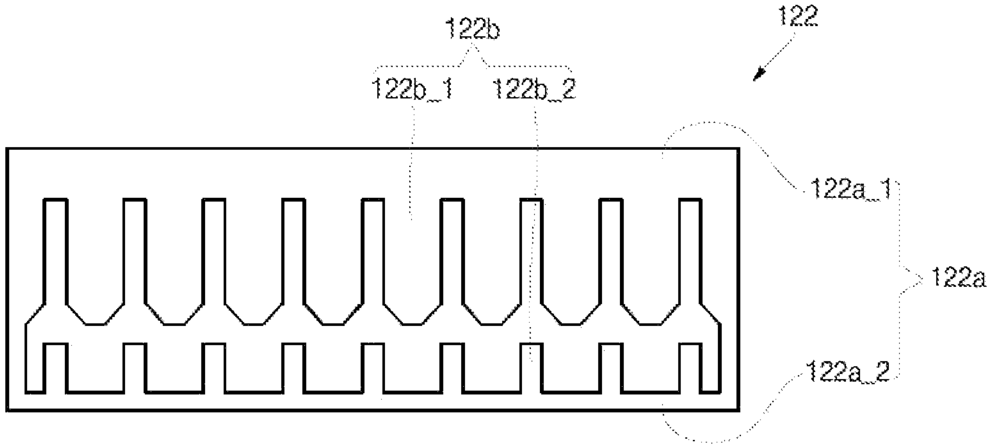
Figure 4I:
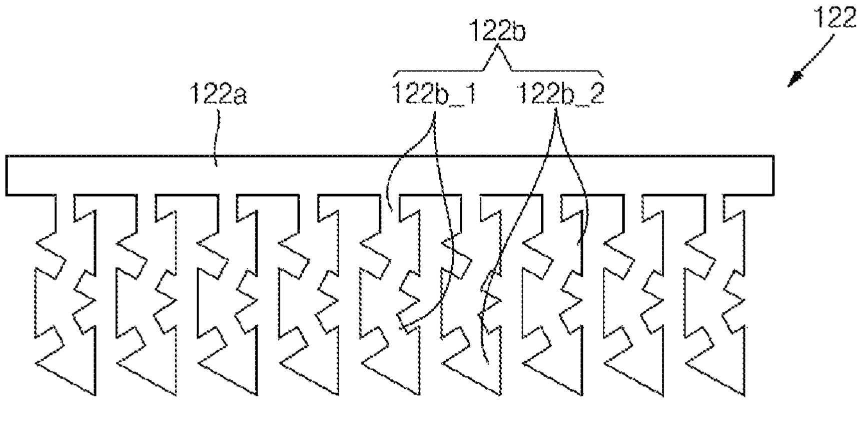
Figure 4J:
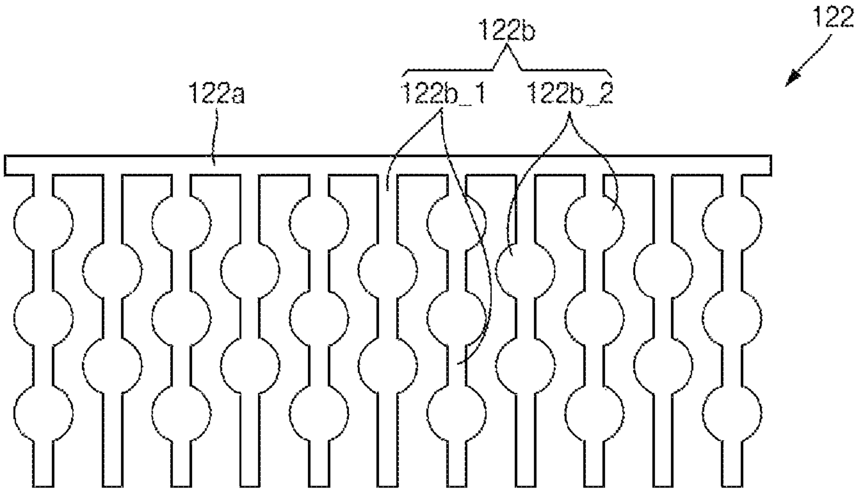

The auxiliary line 122*b* may include a line-shaped auxiliary line-center line 122*b*_1 and protrusion patterns 122*b*_2 protruding from the auxiliary line-center line 122*b*_1 in the length direction (x). Here, the protrusion patterns 122*b*_2 may have a circular, polygonal or line shape. As an example, as shown in FIG. 4A, the protrusion patterns 122*b*_2 may have a triangular shape, and as shown in FIG. 4D, the protrusion patterns 122*b*_2 may have a line shape. As another example, as shown in FIGS. 4E to 4G, the protrusion patterns 122*b*_2 may have an octagonal shape. As a further example, as shown in FIG. 4J, the protrusion patterns 122*b*_2 may have a circular shape, and the shapes thereof may vary in various manners.

In addition, when the protrusion patterns 122*b*_2 are polygonal or line-shaped, at least one side of the protrusion patterns 122*b*_2 may have a substantially constant angle with respect to the auxiliary line-center line 122*b*_1. In certain advantageous embodiments, at least one side of the protrusion patterns 122*b*_2 may have a substantially constant angle of about 45 degrees or more and less than about 135 degrees with respect to the auxiliary line-center line 122*b*_1.

The auxiliary line 122*b* may include one or more protrusion patterns 122*b*_2. As an example, as shown in FIG. 4A, one auxiliary line 122*b* may include three protrusion patterns 122*b*_2. As another example, as shown in FIG. 4F, one auxiliary line 122*b* may include one protrusion pattern 122*b*_2. That is, the auxiliary line 122*b* may include one or more protrusion patterns 122*b*_2, and the number of protrusion patterns 122*b*_2 included in the auxiliary line 122*b* is not limited.

Here, the protrusion patterns 122*b*_2 may be patterns that protrude to at least one side from the auxiliary line-center line 122*b*_1. As an example, as shown in FIG. 4A, the protrusion patterns 122*b*_2 may protrude substantially symmetrically to each other on both sides of auxiliary line-center line 122*b*_1, or as shown in FIG. 4C, the protrusion patterns 122*b*_2 may protrude to one side around the auxiliary line-center line 122*b*_1.

In addition, the auxiliary line 122*b* may have the protrusion patterns 122*b*_2 having a shape corresponding to that of an adjacent auxiliary line 122*b*, and thus one side of one of the protrusion patterns 122*b*_2 of the auxiliary lines 122*b* adjacent to each other may face each other. As an example, as shown in FIG. 4A, the protrusion patterns 122*b*_2 included in odd-numbered auxiliary lines 122*b* may be shaped of inverted triangles, and the protrusion patterns 122*b*_2 included in even-numbered auxiliary lines 122*b* may be shaped of triangles. Here, one side of the inverted triangle protrusion patterns 122*b*_2 included in the odd-numbered auxiliary line 122*b* and one side of the triangular protrusion patterns 122*b*_2 included in the even-numbered auxiliary line 122*b* may be parallel to each other. As another example, as shown in FIG. 4E, a plurality of auxiliary lines 122*b* may have protrusion patterns 122*b*_2 having the same shape, and may face one side of an adjacent protrusion pattern 122*b*_2.

In addition, the length of the auxiliary line 122*b* extending in the width direction (y) may be the same as or different from the length of the adjacent auxiliary line 122*b*. As an example, as shown in FIGS. 4A to 4E, the plurality of auxiliary lines 122*b* may all have the same length. As another example, as shown in FIGS. 4F to 4H, the lengths of the plurality of auxiliary lines 122*b* may differ from the lengths of adjacent auxiliary lines 122*b*. Here, the odd-numbered auxiliary lines 122*b* may all have the same length, and the even-numbered auxiliary lines 122*b* may all have the same length. That is, in the plurality of auxiliary lines 122*b*, two auxiliary lines 122*b* having different lengths may be alternately arranged. Of course, the plurality of auxiliary lines 122*b* may have various lengths, and three or more auxiliary lines 122*b* having different lengths may be alternately arranged.

In addition, the plurality of auxiliary lines 122*b* may include auxiliary lines 122*b* including the protrusion patterns 122_b__2 and auxiliary lines 122_b_ not including the protrusion patterns 122_b__2. As an example, as shown in FIGS. 4G and 4H, the auxiliary lines 122_b_ including the protrusion patterns 122_b__2 and the auxiliary lines 122_b_ not including the protrusion patterns 122_b__2 may be alternately arranged.

In addition, when there are two reference lines 122_a_, the plurality of auxiliary lines 122_b_ may be connected to at least one reference line 122_a_ of the two reference lines 122_a__1 and 122_a__2 substantially parallel to each other. As an example, as shown in FIG. 4B, the plurality of auxiliary lines 122_b_ may be connected to both the first reference line 122_a__1 and the second reference line 122_a__2.

As another example, as shown in FIG. 4H, the plurality of auxiliary lines 122_b_ may include an auxiliary line 122_b_ connected to a first reference line 122_a__1 and an auxiliary line 122_b_ connected to a second reference line 122_a__2. In addition, when the tab connector portion 122 has the auxiliary line 122_b_ connected only to the second reference line 122_a__2 and the auxiliary line 122_b_ connected only to the first reference line 122_a__1, the auxiliary line 122_b_ may include only the auxiliary line-center line 122_b__1, without protrusion pattern 122_b__2.

In addition, the widths of the plurality of auxiliary lines 122_b_ extending in the length direction (x) may be equal to or different from the widths of adjacent auxiliary lines 122_b_. As an example, as shown in FIG. 4G, the widths of the plurality of auxiliary lines 122_b_ may be equal to each other. As another example, as shown in FIG. 4H, the widths of the plurality of auxiliary lines 122_b_ may be different from each other. In a non-limiting example, the widths of the plurality of auxiliary lines 122_b_ are different from the widths of adjacent auxiliary lines 122_b_. Here, the width of the auxiliary line 122_b_ connected to the first reference line 122_a__1 may be greater than the width of the auxiliary line 122_b_ connected to the second reference line 122_a__2. Of course, the reverse is also possible. As described above, the width of the auxiliary line 122_b_ connected to the second reference line 122_a__2 and the width of the auxiliary line 122_b_ connected to the first reference line 122_a__1 may be different from each other.

In addition, a plurality of auxiliary line-center lines 122_b__1 included in one auxiliary line 122_b_ may have a substantially constant angle and extend in different directions. For example, the auxiliary line-center lines 122_b__1 included in one auxiliary line 122_b_ may have a bent portion. As an example, as shown in FIG. 4I, in the auxiliary line 122_b_, three auxiliary line-center lines 122_b__1 may extend in different directions, and three protrusion patterns 122_b__2 may be positioned between the respective extended auxiliary line-center lines 122_b__1. That is, the auxiliary lines 122_b_ may connect the auxiliary line-center lines 122_b__1 extending in different directions and the protrusion patterns 122_b__2. However, even if the plurality of auxiliary line-center lines 122_b__1 extend in different directions, the auxiliary lines 122_b_ may extend substantially perpendicularly from the reference line 122_a_ along the width direction (y).

In addition, the structure and pattern shape of the positive tab connector portion 123 may be the same as or similar to those of the negative tab connector portion 122. After the tab connector portions 122 and 123 are coupled to the electrode tabs 112 and 113, by means of the reference line 122_a_, the auxiliary lines 122_b_ substantially perpendicularly extending from the reference line 122_a_, and the protrusion patterns 122_b__2 provided in the auxiliary lines 122_b_, deterioration in the coupling force, which may occur due to external vibration, can be prevented. In addition, when the tab connector portions 122 and 123 are compressed with the electrode tabs 112 and 113 with the anisotropic conductive film 130 interposed therebetween, a binder of the anisotropic conductive film 130 may more easily move into slits between a plurality of auxiliary lines spaced apart from each other, and thus electrical conduction between the tab connector portions 122 and 123 and the electrode tabs 112 and 113 may be facilitated. In addition, by means of the plurality of auxiliary lines 122_b_ extending along the width direction (y), the tab connector portions 122 and 123 can be prevented from being separated from the electrode tabs 112 and 113 due to the vibration applied in the length direction (x) of the circuit board 121. In addition, by means of the reference line 122_a_ and the protrusion patterns 122_b__2 provided in the auxiliary lines 122_b_, deterioration in the coupling force of the tab connector portions 122 and 123 due to the vibration applied in the width direction (y) of the circuit board 121 may be prevented.

As described above, the battery pack of the present disclosure includes auxiliary lines in which a tab connector portion extends vertically from a reference line, and protrusion patterns provided in the auxiliary lines, thereby preventing deterioration in bonding strength due to external impact after bonding with an electrode tab.

More specifically, in the battery pack of the present disclosure, the tab connector portion can be prevented from being separated from the electrode tab due to vibration applied in the length direction by means of the auxiliary lines extending along the width direction, and the tab connector portion can be prevented from being separated from the electrode tab by means of the protrusion patterns provided in the auxiliary lines.

In addition, in the battery pack of the present disclosure, when the tab connector portion and the electrode tab are coupled, a binder of an anisotropic conductive film may move into slits between the plurality of auxiliary lines spaced apart from each other of the tab connector portion, and thus electrical conduction between the tab connector portion and the electrode tab may be facilitated.

While the foregoing embodiment is only one embodiment for carrying out the battery pack according to the present disclosure, which is not limited to the embodiment, it will be understood by a person skilled in the art that various changes in form and details may be made therein without departing from the spirit and scope of the present disclosure as defined by the following claims.

What is claimed is:

1. A battery pack comprising:

an electrode assembly comprising a positive electrode tab and a negative electrode tab;

a circuit board comprising a positive electrode tab connector portion electrically connected to the positive electrode tab, and a negative electrode tab connector portion electrically connected to the negative electrode tab, the circuit board having a length and a width; and an anisotropic conductive film interposed between the negative electrode tab and the negative electrode tab connector portion and electrically connecting the negative electrode tab and the negative electrode tab connector portion, wherein the negative electrode tab connector portion comprises a reference line extending along a direction of the length of the circuit board and a plurality of auxiliary lines extending from the reference line along a direction of the width of the circuit board and spaced apart from each other, wherein each of the plurality of auxiliary lines comprises an auxiliary line-center line extending along the width direction and one or more protrusion patterns protruding from the auxiliary line-center line along the length direction, and wherein the plurality of auxiliary lines are spaced apart from each other to define a slit between adjacent ones of the plurality of auxiliary lines, and the anisotropic conductive film is disposed within the slit.

2. The battery pack of claim 1, wherein the protrusion patterns have a circular, polygonal, or line shape.

3. The battery pack of claim 2, wherein when the protrusion patterns have a polygonal or line shape, at least one side of the protrusion patterns has a substantially constant angle with respect to the auxiliary line-center line.

4. The battery pack of claim 3, wherein the substantially constant angle is in the range of about 45 degrees to about 135 degrees.

5. The battery pack of claim 1, wherein the reference line and the auxiliary line-center line are substantially perpendicular to each other.

6. The battery pack of claim 1, wherein the protrusion patterns protrude to one side of the auxiliary line-center line.

7. The battery pack of claim 1, wherein the protrusion patterns protrude substantially symmetrically with respect to each other on both sides of the auxiliary line-center line.

8. The battery pack of claim 1, wherein one side of the protrusion patterns of the plurality of auxiliary lines is opposite to the protrusion patterns of adjacent auxiliary lines.

9. The battery pack of claim 1, wherein the reference line comprises a first reference line connecting one side of the plurality of auxiliary lines, and a second reference line connecting the other side of the plurality of auxiliary lines.

10. The battery pack of claim 9, wherein the plurality of auxiliary lines comprises first auxiliary lines connected only to the first reference line and second auxiliary lines connected only to the second reference line.

11. The battery pack of claim 10, wherein the first auxiliary lines and the second auxiliary lines have different widths.

12. The battery pack of claim 1, wherein the lengths of the plurality of auxiliary lines extending in the width direction are equal to or greater than the lengths of adjacent auxiliary lines.

13. The battery pack of claim 1, wherein the widths of the plurality of auxiliary lines extending in the length direction are equal to or greater than the widths of adjacent auxiliary lines.

14. The battery pack of claim 1, wherein in each of the plurality of auxiliary lines, the auxiliary line-center line has a bent portion.

15. The battery pack of claim 1, wherein the plurality of slits are sized to allow the anisotropic conductive film to move within the slits.

16. The battery pack of claim 1, wherein the anisotropic conductive film comprises a binder configured to move between the slits to facilitate the electrical connection between the negative electrode tab and the negative electrode tab connector portion.

17. The battery pack of claim 1, wherein all of the negative electrode tab connector portion, the anisotropic conductive film, and the negative electrode tab overlap in a direction of the thickness of the circuit board such that the auxiliary lines of the negative electrode tab connector portion overlap both the anisotropic conductive film and the negative electrode tab in the direction of the thickness of the circuit board.

* * * * *